United States Patent
Ratet

(10) Patent No.: US 7,077,461 B2
(45) Date of Patent: Jul. 18, 2006

(54) SOUND INSULATING DEVICE DESIGNED TO BE MOUNTED IN A TUBULAR PART, IN PARTICULAR A MOTOR VEHICLE BODY PART

(75) Inventor: Florence Ratet, Chalette sur Loing (FR)

(73) Assignee: Hutchinson, Paris (FR)

(*) Notice: Subject to any disclaimer, the term of this patent is extended or adjusted under 35 U.S.C. 154(b) by 107 days.

(21) Appl. No.: 10/480,754

(22) PCT Filed: Jul. 2, 2002

(86) PCT No.: PCT/FR02/02294

§ 371 (c)(1),
(2), (4) Date: Apr. 19, 2004

(87) PCT Pub. No.: WO03/004314

PCT Pub. Date: Jan. 16, 2003

(65) Prior Publication Data

US 2004/0239148 A1    Dec. 2, 2004

(30) Foreign Application Priority Data

Jul. 2, 2001   (FR)   ................................. 01 08774

(51) Int. Cl.
*B60R 27/00*   (2006.01)
(52) U.S. Cl. .................... 296/187.02; 296/187.05; 296/203.1; 296/205; 277/645; 428/99; 428/304.4
(58) Field of Classification Search ........... 296/187.02, 296/187.05, 187.06, 187.12, 203.1, 205, 296/901.01; 181/207, 204, 205, 295, 285, 181/290, 211; 277/630, 645, 646, 637, 650, 277/316, 916; 428/99, 122, 139, 192, 63, 428/133, 223, 304.4, 319.1
See application file for complete search history.

(56) References Cited

U.S. PATENT DOCUMENTS

| | | | |
|---|---|---|---|
| 5,642,914 A | | 7/1997 | Takabatake |
| 5,752,737 A | * | 5/1998 | Heldt et al. ............ 296/187.12 |
| 5,755,486 A | * | 5/1998 | Wycech .................. 296/187.02 |
| 5,806,915 A | * | 9/1998 | Takabatake ............ 296/187.02 |
| 5,806,919 A | * | 9/1998 | Davies .................. 296/187.02 |
| 5,884,962 A | * | 3/1999 | Mattingly et al. ...... 296/187.05 |
| 6,247,287 B1 | * | 6/2001 | Takabatake ............ 296/187.02 |
| 6,419,305 B1 | * | 7/2002 | Larsen .................. 296/187.02 |

FOREIGN PATENT DOCUMENTS

| WO | WO 99/37506 A | 7/1999 |
|---|---|---|
| WO | WO 00/03894 A | 1/2000 |
| WO | WO 01/83206 A | 11/2001 |

* cited by examiner

*Primary Examiner*—Lori L. Coletta
(74) *Attorney, Agent, or Firm*—Alston & Bird LLP

(57) ABSTRACT

A sound insulation device for mounting in a tubular part, in particular a motor vehicle bodywork part, the device comprising a partitioning insert, a cord of a composition that is thermally expandable so as to form a foam, said cord being fitted to the periphery of the insert, retaining means for holding the cord on the insert prior to expansion of the cord, and means for encouraging the cord to expand towards the inside wall of the tubular part, wherein the cord is formed by being extruded in rectilinear manner without any particular shaping, and wherein the cord retaining means are integrally molded with the partitioning insert and also serve to shape the extruded cord around the periphery of the partitioning insert.

16 Claims, 3 Drawing Sheets

SOUND INSULATING DEVICE DESIGNED TO BE MOUNTED IN A TUBULAR PART, IN PARTICULAR A MOTOR VEHICLE BODY PART

The invention relates to a sound insulation device for mounting in a tubular part, in particular a motor vehicle bodywork part.

BACKGROUND OF THE INVENTION

Motor vehicle bodywork, in particular in the body proper, includes tubular parts such as pillars beside openings, side members, . . . , which constitute significant paths for propagating and delivering noise of various kinds into the vehicle cabin, thereby degrading passenger comfort.

Providing sound insulation for such tubular parts thus poses a problem, given that these parts are also of various shapes with varying sections, and may themselves be built up by assembling together a plurality of parts.

In order to limit the propagation of such noise, vehicle manufacturers have for a long time been closing off the inside sections of tubular parts by locally injecting a composition that can be caused to expand chemically so as to create a foam which comes into contact with the inside wall of such a part and form at least one sound partition. Foam is injected through a hole pierced in the part after the vehicle body has been painted. That solution generally gives satisfaction when the part, or the portion within the part, where the partition is to be installed is generally in the form of a tube having a right section that is substantially circular and of diameter that is not too great. However, that solution presents the drawback of a hole being pierced after the part has been painted, which constitutes an additional operation and which can run the risk of corrosion if the part is made of metal, and it requires the use of special equipment for injecting the foam.

U.S. Pat. No. 5,642,914 discloses a sound insulation device comprising a thermally expandable material that is generally in the form of a flat ring fitted to the periphery of a partitioning insert. The ring is obtained by extrusion or by molding, thereby giving it in advance the shape of the outline of the partitioning insert.

Document WO 01/83206 discloses a sound insulation device in which the thermally expandable material is molded on the periphery of a partitioning insert or is in the form of a strip which is bonded to the periphery of said insert by adhesive or by means of staples.

OBJECTS AND SUMMARY OF THE INVENTION

An object of the invention is to devise a novel solution to the problem of providing tubular parts with sound insulation, which solution is suitable for being applied simply, and regardless of the shape of the section of the part that needs to be insulated acoustically.

To this end, the invention provides a sound insulation device for a tubular part, in particular a motor vehicle bodywork part, the device comprising a partitioning insert, a cord of a composition that is thermally expandable so as to form a foam, said cord being fitted to the periphery of the insert, retaining means for holding the cord on the insert prior to expansion of the cord, and means for encouraging the cord to expand towards the inside wall of the tubular part, wherein the cord is formed by being extruded in rectilinear manner without any particular shaping, and wherein the cord retaining means are integrally molded with the partitioning insert and also serve to shape the extruded cord around the periphery of the partitioning insert.

Advantageously, the expandable cord is made of a vulcanizable synthetic rubber mastic of the butyl, halogenated butyl, or nitrile type, of poylchloroprene, or of ethylene propylene diene monomer (EPDM), for example. It being understood that it is also possible to cause the expansion or swelling ratio of the cord to vary on a case by case basis as a function of the space to be filled between the partitioning insert and the inside wall of the tubular part.

In an embodiment, the retaining means are constituted by hooks of gutter shape which are disposed around at least a fraction of the periphery of the partitioning insert so as to enable said insert to be unmolded without any problem of undercut.

Advantageously, the retaining hooks are disposed on opposite sides of the axis of the cord without being placed facing one another.

In general, the means for encouraging the cord to expand towards the inside wall of the tubular part are constituted by a peripheral wall which surrounds the partitioning insert, and the means for retaining the cord prior to expansion are situated outside the peripheral wall of the insert.

In an embodiment, the insert presents overall a right section of H-shape, with a central portion and the above-mentioned peripheral wall extending on either side of the central portion to form means that encourage the cord to expand towards the inside wall of the tubular part.

In another embodiment, the partitioning insert is constituted by two plates fixed one on the other and spaced apart from each other by a spacer-forming side wall that defines a peripheral groove suitable for receiving an expandable cord, and leaks are provided through the side wall to prevent the plates deforming while the cord is expanding.

A sound insulation device of the invention provides the particular advantage of avoiding the need to shape the thermally expandable cord to match the shape of the outline of any specific partitioning insert prior to fitting the cord thereto, and of enabling the cord to be shaped and held without having recourse to additional means, thereby facilitating the operations of mounting such a cord and being easily adaptable to partitioning inserts of arbitrary shape.

The invention also provides a tubular part, in particular a motor vehicle bodywork part, which tubular part includes a sound insulation device presenting all or some of the above-specified characteristics, with the cord being expanded thermally while the part is being painted.

BRIEF DESCRIPTION OF THE DRAWINGS

Other advantages, characteristics, and details of the invention appear from the additional description below given with reference to the accompanying drawings themselves given purely by way of example, and in which.

MORE DETAILED DESCRIPTION

Figure 1:
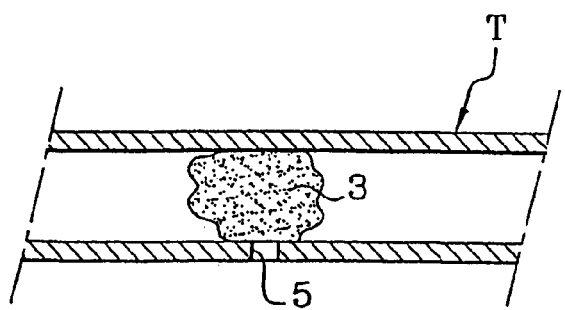
FIG. 1 is a diagrammatic and fragmentary section view of a sound insulation device for a tubular part, of the type described as prior art.

In the prior art mentioned in the introduction and as shown in FIG. 1, a tubular part T of motor vehicle bodywork is locally closed off on the inside by a plug of foam 3 which forms a sound insulation partition to prevent noise propagating. A hole 5 is pierced through the part T and a chemically expandable composition is injected through the hole 5 in order to create the foam plug 3.

Figure 2:
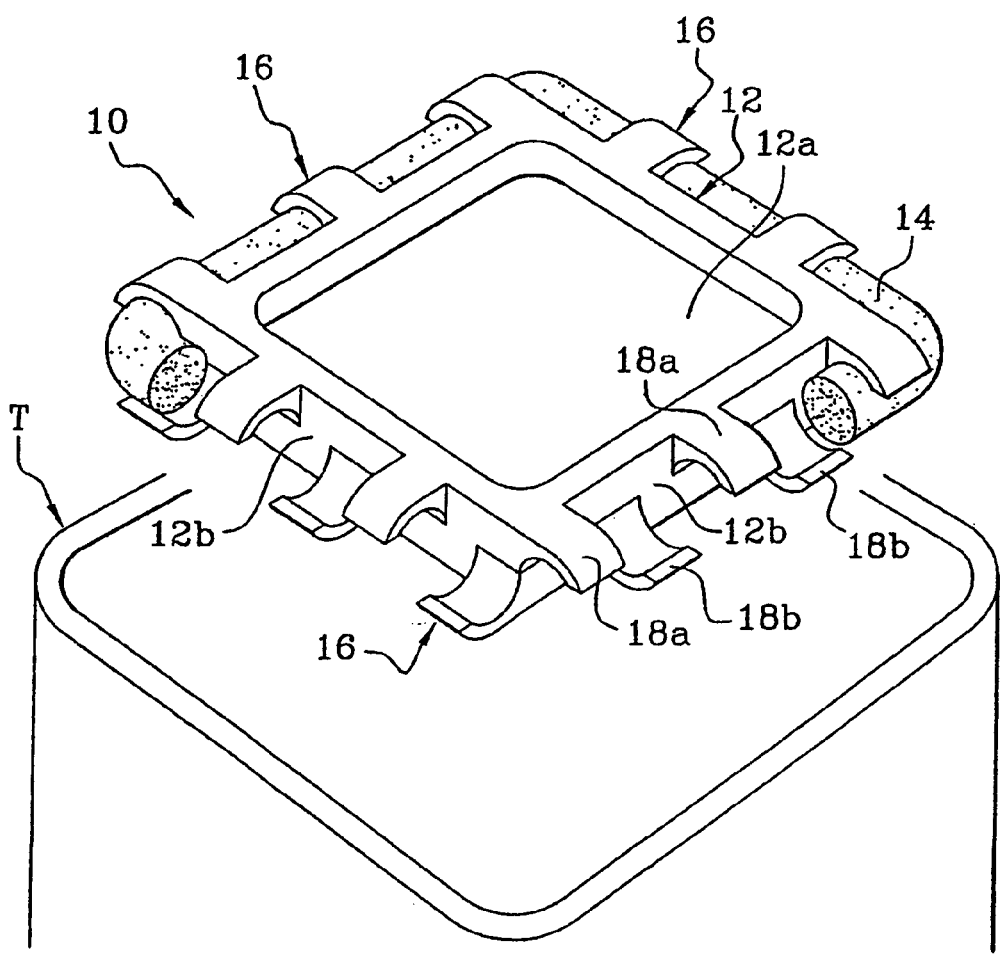
FIG. 2 is a perspective view for showing an embodiment of a sound insulation device of the invention, the device comprising in particular a partitioning insert and a cord of expandable material.
Figure 3:
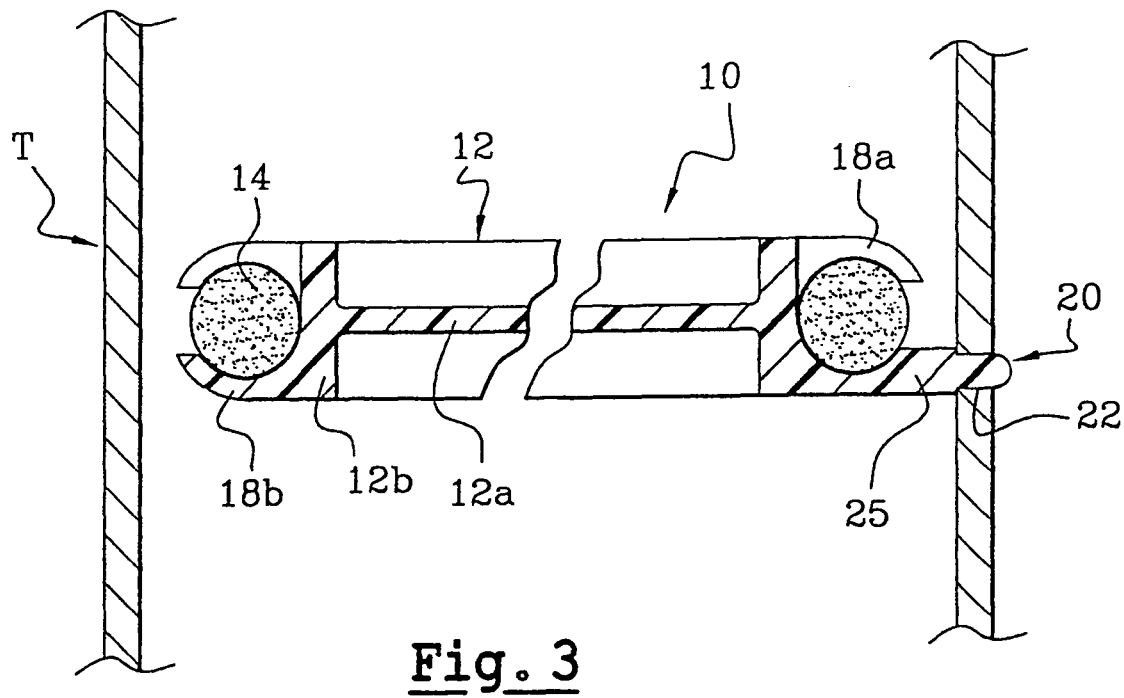
FIG. 3 is a section view on line III—III of FIG. 2 for showing the sound insulation device prior to the cord being expanded.
Figure 4:
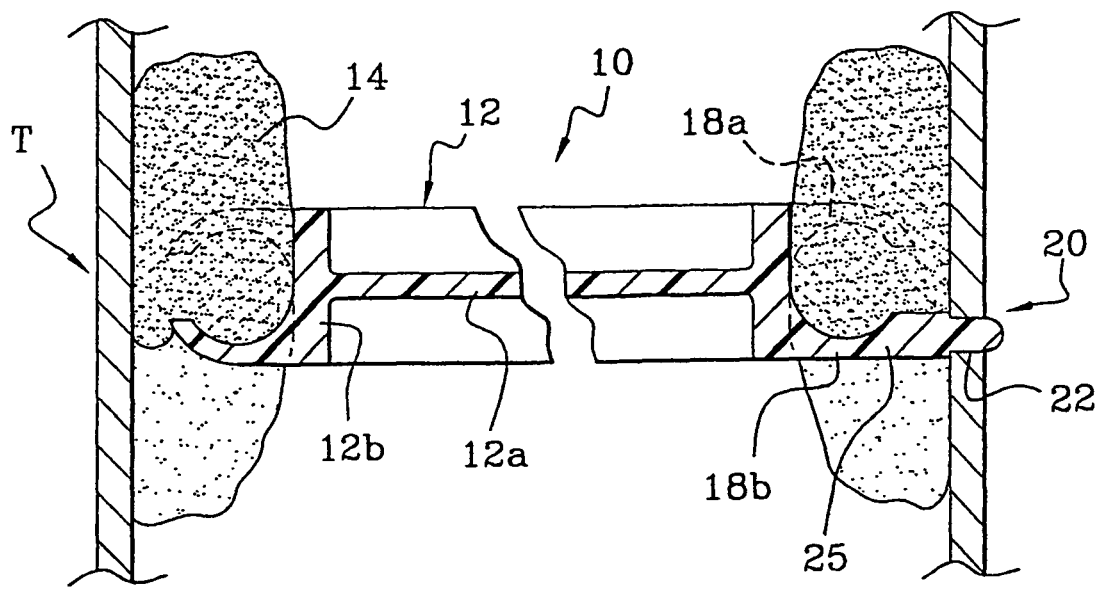
FIG. 4 is a view similar to that of FIG. 3, after the cord has been expanded.

An embodiment of the sound insulation device 10 of the invention is shown in FIGS. 2 to 4. The insulation device 10 is for mounting inside a tubular part T and comprises at least one partitioning insert 12, a flexible cord 14 of a composition suitable for expanding thermally to form a foam, and retaining means 16 for holding the cord 14 to the periphery of the insert 12 prior to expansion of the cord.

The partitioning insert 12 as shown is generally rectangular in overall shape, it being understood that its shape depends on the shape of the inside section presented by the tubular part T in the zone where the insert 12 is to be mounted.

The partitioning insert 12 presents a right section of H-shape with a central portion 12a bordered all around its periphery by a peripheral wall 12b which extends on either side of the central portion 12a. This wall 12b forms a barrier to prevent the cord 14 expanding towards the inside of the insert 12, thereby encouraging it to expand towards the inside wall of the tubular part T. The means 16 for holding the cord 14 are thus situated outside the peripheral wall 12b.

The insert 12 also presents outside dimensions which are smaller than the dimensions of the inside section of the tubular part T, firstly to enable the cord 14 to be fitted thereto, and secondly to leave a peripheral gap (FIG. 3) which is subsequently filled by the foam (FIG. 4) that results from the cord 14 expanding by a thermal effect.

The retaining means 16 for the cord 14 serve to hold the cord 14 during operations of handling and mounting the insert, it being understood that the cord is caused to expand thermally only subsequently during the operation of painting the vehicle body, where a temperature of about 150° C. to 200° C. suffices to cause it to expand. The cord 14 is advantageously made by extrusion in the form of a substantially rectilinear rod without any special shaping, and the retaining means 16 also serve to shape the cord 14 around the periphery of the partitioning insert 12.

Furthermore, the retaining means 16 must not oppose expansion of the cord 14, i.e. the foam that results from said expansion must come into contact with the inside wall of the tubular part T all around the periphery of the insert 12 like a sealing gasket.

In order to satisfy these conditions, the retaining means 16 are of a suitable shape which, in combination with the peripheral wall 12b of the insert 12, encourages the cord 14 to expand towards the inside wall of the tubular part T. In general, the retaining means 16 are situated on the outside of the wall 12b. In the example shown in the drawings, the retaining means 16 comprise at least hooks 18a and 18b in the form of gutters that are open towards the inside wall of the tubular part T so as to encourage the cord 14 to expand in that direction. Along one of the sides of the plate formed by the insert 12, the hooks 18a and 18b are disposed respectively on opposite sides of the cord 14 in alternating manner so that two hooks 18a and 18b do not face each other (FIG. 2). The hooks 18a and 18b may optionally be spaced apart regularly, or their disposition may vary as a function of the shape of the insert.

In addition, the retaining means 16 are not restricted to hooks 18a and 18b of the type shown in the drawings, i.e. a single insert 12 may have different retaining means, it being understood that a gutter shape is preferred. For example, the retaining means 16 on at least one side of the plate formed by the insert 12 may be constituted by a gutter which extends over substantially the entire length of said side.

In a preferred embodiment, the partitioning insert 12 is made of a thermoplastic material such as a polyamide, for example, and the retaining means 16 are integrally molded with the insert 12. In other words, the hooks 18a and 18b are disposed in such a manner as to enable the insert 12 to be unmolded without any undercut problems.

The partitioning insert 12 must be of a shape that matches the shape of the tubular part in which it is to be mounted, which means that a variety of shapes are required, i.e. its shape is not restricted to a plate that is square or rectangular.

The cord 14 is advantageously made of a vulcanizable synthetic rubber of butyl, halogenated butyl, or nitrile type, of polychloroprene or of EPDM, for example, i.e. a material other than a thermoplastic. In right section, the cord 14 may be of arbitrary shape, and will usually be square or circular.

In general, the expansion or swelling ratio of the cord 14 can be caused to vary as a function of the amount of space to be filled between the insert 12 and the inside wall of the tubular part T. This space may vary from one part to another with assembly tolerances that are critical to a greater or lesser extent.

In order to cause the expansion or swelling ratio of the cord 14 to vary, it suffices to add a swelling agent thereto in a quantity which is a function of the desired expansion ratio. For example, it is possible to select a large expansion ratio of the order of 1000% to 1400% for a cord 14 having a diameter of about 5 millimeters (mm) to 7 mm when the space to be filled between the insert 12 and the inside wall of the tubular part T is relatively large. In contrast, an expansion ratio of about 100% to 500% may suffice for a cord having a diameter of less than 4 mm when the space to be filled is small.

The partitioning insert 12 can be fastened to the inside of the tubular part T in various ways. When the insert 12 is made of thermoplastic material, it can be fastened by means of at least one resilient tab 20 forming a clip which is engaged in a hole 22 pierced in the tubular part T. As shown in FIGS. 3 and 4, the resilient tab 20 is situated at the end of a lateral support arm 25 which locally extends the peripheral wall 12b of the insert. Advantageously, this tab 20 and its support arm 25 are integrally molded with the insert 12. With this type of fastening, the hole 22 pierced in the tubular part T is situated on the same side as the source of noise.

Figure 5:
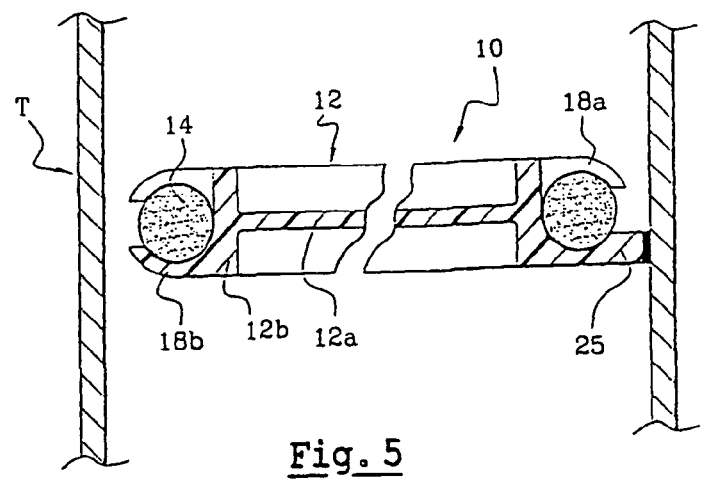
FIG. 5 is a section view showing a variant fastening of the positioning insert.

In a variant shown in FIG. 5, the resilient fastening tab 20 can be omitted by performing an operation of sticking the arm 25 to the inside of the tubular part T, thereby avoiding the need to pierce a hole.

Figure 6:
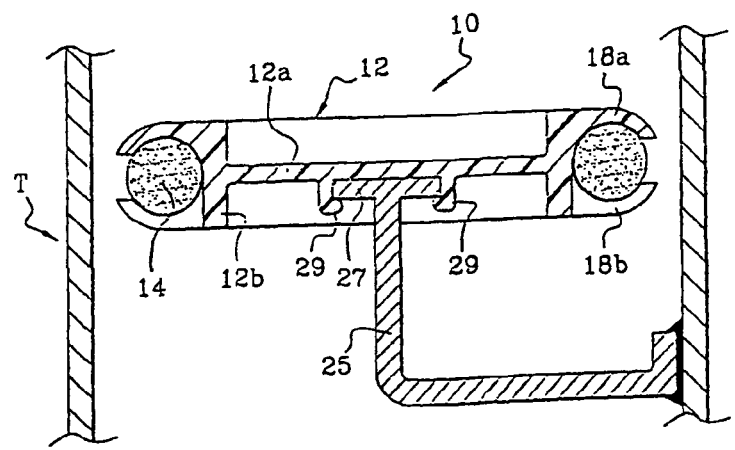
FIG. 6 is a section view showing another variant fastening for the positioning insert.

In another variant shown in FIG. 6, the insert 12 is fixed by soldering or welding a metal support bracket 25 which is connected to the insert 12 by means of a plate 27 received in a rail defined by two ribs 29 projecting from one of the faces of the central portion 12a of the insert 12.

It is also possible to envisage using a metal partitioning insert with two techniques for implementing the retaining means. In the first technique, the retaining means are formed directly on the periphery of the insert, thus requiring stamping and cutting operations to be performed. In the second technique, the retaining means are made of a plastics material and are fitted to the periphery of the insert by adhesive, heat-sealing, clamping, snap-fastening, or the like.

In general, when the tubular part T is made by assembling together a plurality of parts, the partitioning insert 12 can be fixed to at least one of the parts prior to the part being assembled to one another. However, when the tubular part T is a single piece, then the partitioning insert 12 is mounted towards one of the ends thereof.

Figure 7:
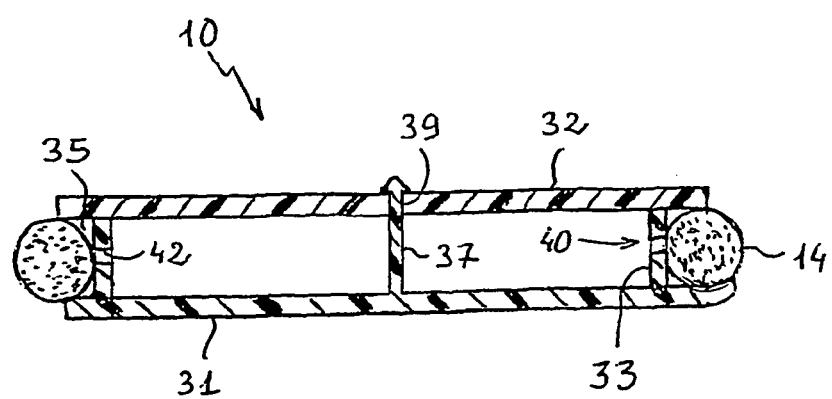
FIG. 7 is a section view showing another embodiment of a sound insulation device of the invention.

In another embodiment shown in FIG. 7, the partitioning insert 12 is constituted by two pieces of thermoplastic material which are assembled to each other by adhesive or by snap-fastening. More precisely, the first piece is a plate 31 with a side wall 33 projecting from one of its faces, the side wall being set back from the peripheral edge of the plate 31, and the second piece is a plate 32 fitted against the side wall 33. The two plates 31 and 32 assembled together in this way have thickness of millimeter order, and between them then define a peripheral groove 35 suitable for receiving the cord 14. The two plates 31 and 32 are fastened to each other by means of at least one clip 37, e.g. integrally molded with the plate 31 and penetrating in an opening 39 made through the plate 32.

Leaks 40 are advantageously provided through the side wall 33 so as to ensure that swelling of the cord 14 does not lead to the plates 31 and 32 being deformed.

These leaks 40 may be implemented in the form of holes 42 made through the side wall 33, or by a gap in said side wall. The leaks 40 are preferably situated in rectilinear zones of the insert 12, i.e. in zones that are not critical.

Means for retaining the cord 14 by hooks of the kind described for the first embodiment are particularly well adapted to shaping and holding a cord that is relatively thick, i.e. that is quite stiff, for a space to be filled that is relatively large. In contrast, when the space to be filled is smaller, it is possible to use a cord of smaller thickness and thus of greater flexibility. In which case, the retaining means can be of a simpler design. By way of example, and as shown in FIG. 7, the retaining means may be constituted merely by a peripheral rim surrounding the plate 31, possibly discontinuously.

Above it is assumed that the means for retaining the cord of mastic are suitable for holding it to the periphery of the partitioning insert without it being necessary to provide any fastening means. Nevertheless, it is also possible, optionally, to provide means for fastening the filler cord on the partitioning insert, e.g. by means of adhesive.

What is claimed is:

1. A sound insulation device for mounting in a tubular part, in particular a motor vehicle bodywork part, the device comprising a partitioning insert, a cord of a composition that is thermally expandable so as to form a foam, said cord being fitted to the periphery of the insert, retaining means for holding the cord on the insert prior to expansion of the cord, and means for encouraging the cord to expand towards the inside wall of the tubular part, the cord being formed by being extruded in rectilinear manner without any particular shaping, and the cord retaining means being integrally molded with the partitioning insert and also serving to shape the extruded cord around the periphery of the partitioning insert, wherein the expandable cord presents a variable swelling ratio which is selected as a function of the space to be filled between the insert and the inside wall of the tubular part, wherein the swelling ratio of the expandable cord is about 1000% to 1400%, and wherein the diameter of the cord is about 5 mm to 7 mm.

2. The sound insulation device according to claim 1, wherein the expandable cord is made of a vulcanizable synthetic rubber mastic of the butyl, halogenated butyl, or nitrile type, of poylchloroprene, or of EPDM.

3. A sound insulation device for mounting in a tubular part, in particular a motor vehicle bodywork part, the device comprising a partitioning insert, a cord of a composition that is thermally expandable so as to form a foam, said cord being fitted to the periphery of the insert, retaining means for holding the cord on the insert prior to expansion of the cord, and means for encouraging the cord to expand towards the inside wall of the tubular part, the cord being formed by being extruded in rectilinear manner without any particular shaping, and the cord retaining means being integrally molded with the partitioning insert and also serving to shape the extruded cord around the periphery of the partitioning insert, wherein the expandable cord presents a variable swelling ratio which is selected as a function of the space to be filled between the insert and the inside wall of the tubular part, wherein the swelling ratio of the expandable cord is about 100% to 500%, and wherein the diameter of the cord is less than 4 mm.

4. A sound insulation device for mounting in a tubular part, in particular a motor vehicle bodywork part, the device comprising a partitioning insert, a cord of a composition that is thermally expandable so as to form a foam, said cord being fitted to the periphery of the insert, retaining means for holding the cord on the insert prior to expansion of the cord, and means for encouraging the cord to expand towards the inside wall of the tubular part, the cord being formed by being extruded in rectilinear manner without any particular shaping, and the cord retaining means being integrally molded with the partitioning insert and also serving to shape the extruded cord around the periphery of the partitioning insert, wherein the retaining means comprise at least hooks of gutter shape and disposed on at least a fraction of the outline of the partitioning insert in such a manner as to enable said insert to be unmolded without any undercut problem.

5. The sound insulation device according to claim 4, wherein the retaining hooks are disposed on either side of the axis of the cord without facing one another.

6. The sound insulation device according to claim 1, wherein the means for encouraging the cord to expand towards the inside wall of the tubular part are constituted by a peripheral wall surrounding the partitioning insert, and wherein the retaining means for retaining the cord prior to expansion thereof are situated at the outside of the peripheral wall of the insert.

7. The sound insulation device according to claim 6, wherein the insert is generally H-shaped in right section, with a central portion and the peripheral wall which extends on either side of the central portion to form the means which encourage the cord to expand towards the inside wall of the tubular part.

8. The sound insulation device according to claim 1, wherein the partitioning insert is constituted by two plates fixed to each other and faced apart from each other by a spacer-forming side wall defining a peripheral groove suitable for receiving an expandable cord, and wherein leaks are provided through the side wall to prevent the plates deforming while the cord is expanding.

9. The sound insulation device according to claim 1, wherein the insert is made of a thermoplastic material.

10. The sound insulation device according to claim 1, wherein the insert is fixed to the tubular part by means of at least one flexible tab which is engaged in a hole pierced in the tubular part.

11. The sound insulation device according to claim 10, wherein the flexible fixing tab is at the end of a support arm secured to the insert.

12. The sound insulation device according to claim 10, wherein the fixing tab and the support arm are integrally molded with the insert.

13. The sound insulation device according to claim 1, wherein the insert is fastened to the tubular part by adhesive or by soldering or by welding.

14. A tubular part, in particular a motor vehicle bodywork part, the tubular part including a sound insulation device as defined by claim 1.

15. A tubular part according to claim 14, wherein the cord is expanded thermally while the part is being painted.

16. The sound insulation device according to claim 9, wherein the thermoplastic material is a polyamide.

* * * * *